(12) United States Patent
Nomura et al.

(10) Patent No.: US 8,214,554 B2
(45) Date of Patent: Jul. 3, 2012

(54) PERIODIC AND NON-PERIODIC DATA TRANSFER CIRCUIT ANALYZING POINTER INFORMATION

(75) Inventors: Keisuke Nomura, Kanagawa (JP); Tomokazu Kondo, Kanagawa (JP); Yousuke Sasaki, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/034,457

(22) Filed: Feb. 24, 2011

(65) Prior Publication Data

US 2011/0225325 A1 Sep. 15, 2011

(30) Foreign Application Priority Data

Mar. 10, 2010 (JP) ................................ 2010-053296

(51) Int. Cl.
*G06F 13/28* (2006.01)
*G06F 7/00* (2006.01)
(52) U.S. Cl. .......................................... 710/26; 707/600
(58) Field of Classification Search .................... 710/26; 707/600
See application file for complete search history.

(56) References Cited

U.S. PATENT DOCUMENTS

| 6,240,105 | B1* | 5/2001 | Zetts .............................. 370/503 |
| 7,409,471 | B2* | 8/2008 | Saito et al. ....................... 710/35 |
| 7,877,524 | B1* | 1/2011 | Annem et al. .................... 710/26 |
| 2010/0172420 | A1* | 7/2010 | Prasad et al. ............. 375/240.26 |
| 2011/0081965 | A1* | 4/2011 | Klein et al. ...................... 463/31 |

FOREIGN PATENT DOCUMENTS

JP 2002-222162 A 8/2002

* cited by examiner

*Primary Examiner* — Hyun Nam
(74) *Attorney, Agent, or Firm* — Sughrue Mion, PLLC

(57) ABSTRACT

In one cycle for transferring data, a controller forming a data transfer circuit stores pointer information P_A for periodic transfer and pointer information P_B for non-periodic transfer read from a memory respectively in first and second storage areas. The controller sequentially transfers, to a communication bus, data D_A for periodic transfer and data D_B for non-periodic transfer read from the memory by referring to the P_A and P_B. If transfer by a data length indicated in the P_B has not been completed upon the transfer of the D_B, the controller updates the data length to a data length of the remaining data, and updates an address indicated in the P_B to an address on the memory of the remaining data. In the next cycle for transferring data, the controller reads the remaining data from the memory by referring to the P_B, and transfers the remaining data to the communication bus.

6 Claims, 14 Drawing Sheets

Related Art

Related Art

P_A, P_B

| ADDRESS 201 | DATA LENGTH 202 | TRANSFER TYPE 203 | DATA ID 204 | ... |

Fig. 12

Related Art

PERIODIC AND NON-PERIODIC DATA TRANSFER CIRCUIT ANALYZING POINTER INFORMATION

CROSS-REFERENCE TO RELATED APPLICATIONS

This application is based upon and claims the benefit of priority from Japanese patent application No. 2010-053296, filed on Mar. 10, 2010, the disclosure of which is incorporated herein in its entirety by reference.

BACKGROUND

This present invention relates to data transfer circuit and method, and particularly to a circuit and a method for transferring data stored in a memory to a communication path such as a communication bus.

FIG. 11 shows configuration of a communication system to which a typical data transfer circuit 1x is applied. This data transfer circuit 1x is connected to a memory 3 through a system bus 2, and transfers data read from the memory 3 to a communication bus 4. Note that although not shown in FIG. 11, a processor which stores the data in the memory 3, various types of peripheral circuits, and the like are connected to the system bus 2.

The memory 3 stores data D_A (hereinafter, referred to as "data for periodic transfer") which is generated by the processor, the various types of peripheral circuits and the like in synchronization with a cycle for transferring data to the communication bus 4, and data D_B (hereinafter, referred to as "data for non-periodic transfer") which is generated by them out of synchronization with the cycle for transferring data. The data D_A for periodic transfer is the one such as music data which is periodically generated, and thus required for being transferred in real time. On the other hand, the data D_B for non-periodic transfer is the one such as file data which has been prepared in advance of its transfer, and thus not always required for being transferred in real time.

Further, the memory 3 stores pointer information P_A (hereinafter, referred to as "pointer information for periodic transfer") which is used for reading the data D_A for periodic transfer, and pointer information P_B (hereinafter, referred to as "pointer information for non-periodic transfer") which is used for reading the data D_B for non-periodic transfer. As shown in FIG. 12, each of the pointer information P_A and P_B includes a storage destination address 201 of the data on the memory 3, a data length 202, a transfer type 203 which indicates whether or not the data should be transferred in synchronization with the cycle for transferring data, and a data ID (Identifier) 204. The transfer type 203 is set to "periodic transfer" in a case of the data D_A (pointer information P_A) for periodic transfer, and set to "non-periodic transfer" in a case of the data D_B (pointer information P_B) for non-periodic transfer. Note that although not shown in FIG. 12, each of the pointer information P_A and P_B includes an indicator which indicates whether or not the data is the final one among continuous data, an indicator which indicates the validity/invalidity of the pointer information itself, and the like, in addition to the above-mentioned address 201, data length 202, transfer type 203, and data ID 204.

In operation, as shown in FIG. 13, the data transfer circuit 1x waits for the start of a frame (Step T1). The frame means a time interval between cycles for transferring data (i.e., a transfer time unit of the communication bus 4). The start of the frame means the coming of a certain cycle for transferring data.

When the frame is started, the data transfer circuit 1x schedules the order of transferring the data (Step T2). At this time, the data transfer circuit 1x allocates a period immediately after the start of the frame for the periodic transfer, and allocates the remaining period for the non-periodic transfer. Specifically, the data transfer circuit 1x firstly determines a data ID of data D_A for periodic transfer to be the subject of the periodic transfer, and then determines a data ID of data D_B for non-periodic transfer to be the subject of the non-periodic transfer. In a case where plural pieces of data D_A for periodic transfer are stored in the memory 3, the data transfer circuit 1x selects one piece of the data D_A for periodic transfer in ascending order of the data ID 204 (ID value), for example. Similarly, in a case where plural pieces of data D_B for non-periodic transfer are stored in the memory 3, the data transfer circuit 1x selects one piece of the data D_B for non-periodic transfer in ascending order of the data ID 204.

Then, until completion of transfer with respect to all data IDs scheduled at the above-mentioned Step T2 (Step T3), the data transfer circuit 1x repeatedly executes processes shown at the following Steps T4 to T7.

Assume that upon transfer in a frame F1 shown in FIG. 14, the data transfer circuit 1x selects a data ID="A1" of data D_A1 for periodic transfer, and a data ID="B1" of data D_B1 for non-periodic transfer.

In this case, as shown in FIG. 14, the data transfer circuit 1x reads pointer information P_A1 for periodic transfer, which includes the data ID="A1", from the memory 3 through the system bus 2 (Step T4). The data transfer circuit 1x stores the read pointer information P_A1 in an internal storage area (Step T5).

Then, the data transfer circuit 1x analyzes the pointer information P_A1 (Step T6). Specifically, the data transfer circuit 1x refers to the data length 202 indicated in the pointer information P_A1, and thus determines a data length (hereinafter, referred to as "data transfer length") which can be transferred during a period allocated for transferring the data D_A1 for periodic transfer. In this example, assume that there is allocated a period during which the entire data D_A can be transferred, and the data length 202 is determined as the data transfer length.

Then, the data transfer circuit 1x executes a process to transfer the data D_A1, based on the pointer information P_A1 and the data transfer length determined at the above-mentioned Step T6 (Step T7).

Specifically, the data transfer circuit 1x firstly reads data corresponding to the data transfer length from the address 201 indicated in the pointer information P_A1. Thus, as shown in FIG. 14, the data D_A1 for periodic transfer is transferred to the data transfer circuit 1x through the system bus 2.

Next, as shown in FIG. 14, the data transfer circuit 1x transfers the read data D_A1 for periodic transfer to the communication bus 4. In more detail, the data transfer circuit 1x divides the data D_A1 into packet length units which are suitable to a communication standard applied to the communication bus 4 (USB (Universal Serial Bus) standard, PCI (Peripheral Component Interconnect) Express standard, or the like). Then, the data transfer circuit 1x appends a packet number (sequence number) to each packet to be transferred to the communication bus 4. When an acknowledgment (handshake packet) is received from a transfer destination device, the data transfer circuit 1x determines that it has succeeded in transferring the data D_A1. On the other hand, when a negative acknowledgement (reception failure, retransmission request, halt request, or the like) is received from the transfer destination device, the data transfer circuit 1x determines that it has failed in transferring the data D_A1, and then executes a process to retransmit the packets within the period allocated for transferring the data D_A1. Thus, as shown in FIG. 14, the data D_A1 for periodic transfer is transferred to the communication bus 4.

Then, the data transfer circuit 1x returns to the above-mentioned Step T4, and thus reads pointer information P_B1 for non-periodic transfer, which includes the data ID="B1", from the memory 3 through the system bus 2 as shown in FIG. 14. The data transfer circuit 1x moves to the above-mentioned Step T5, and thus overwrites the internal storage area with the read pointer information P_B1.

Then, the data transfer circuit 1x moves to the above-mentioned Step T6, and thus analyzes the pointer information P_B1. Assume that the entire data D_B1 for non-periodic transfer cannot be transferred within a period allocated for transferring the data D_B1. In this case, the data transfer circuit 1x determines, as the data transfer length, a data length which is equivalent to a part of the data D_B1.

Then, the data transfer circuit 1x moves to the above-mentioned Step T7, and thus executes a process to transfer the data D_B1, based on the pointer information P_B1 and the determined data transfer length.

Thus, as shown in FIG. 14, the part of the data D_B1 for non-periodic transfer is transferred to the data transfer circuit 1x through the system bus 2, and then transferred to the communication bus 4.

Note that although not shown in FIGS. 13 and 14, the data transfer circuit 1x overwrites the address 201 indicated in the pointer information P_B1 on the memory 3 with an address corresponding to the remaining data of the data D_B1. Further, the data transfer circuit 1x overwrites the data length 202 indicated in the pointer information P_B1 on the memory 3 with a data length of the remaining data of the data D_B1. In other words, the pointer information P_B1 is transferred in the system bus 2 from the data transfer circuit 1x to the memory 3.

Further, at the above-mentioned Step T3, the data transfer circuit 1x determines that the transfer with respect to all data IDs scheduled at the above-mentioned Step T2 has been completed, thereby terminating the transfer in the frame F1.

After that, when a frame F2 is started as shown in FIG. 14, the data transfer circuit 1x newly selects a data ID="A2" of data D_A2 for periodic transfer, and continues to select the data ID="B1" of the data D_B1 for non-periodic transfer at the above-mentioned Step T2. Then, the data transfer circuit 1x executes the processes shown at the above-mentioned Steps T4 to T7, with respect to each of the data IDs="A2" and "B1".

Firstly, as shown in FIG. 14, the data transfer circuit 1x reads pointer information P_A2 for periodic transfer, which includes the data ID="A2", from the memory 3 through the system bus 2. The data transfer circuit 1x overwrites the internal storage area with the read pointer information P_A2.

Then, the data transfer circuit 1x analyzes the pointer information P_A2, thereby determining, as the data transfer length, the data length 202 indicated in the pointer information P_A2. The data transfer circuit 1x reads data corresponding to the data transfer length from the address 201 indicated in the pointer information P_A2. Thus, as shown in FIG. 14, the data D_A2 for periodic transfer is transferred to the data transfer circuit 1x through the system bus 2.

Then, as shown in FIG. 14, the data transfer circuit 1x transfers the read data D_A2 for periodic transfer to the communication bus 4.

Then, as shown in FIG. 14, the data transfer circuit 1x reads pointer information P_B1 for non-periodic transfer, which includes the data ID="B1", from the memory 3 through the system bus 2. The data transfer circuit 1x overwrites the internal storage area with the read pointer information P_B1.

Then, the data transfer circuit 1x analyzes the pointer information P_B1. Assume that the entire remaining data of the data D_B1 for non-periodic transfer can be transferred within a period allocated for transferring the data D_B1. In this case, the data transfer circuit 1x determines, as the data transfer length, the remaining data length of the data D_B1 for non-periodic transfer (i.e., the data length 202 indicated in the pointer information P_B1). The data transfer circuit 1x reads data corresponding to the data transfer length from the address 201 indicated in the pointer information P_B1. Thus, as shown in FIG. 14, the remaining data of the data D_B1 for non-periodic transfer is transferred to the data transfer circuit 1x through the system bus 2.

Then, as shown in FIG. 14, the data transfer circuit 1x transfers the read remaining data of the data D_B1 for non-periodic transfer to the communication bus 4.

SUMMARY

Recently, in the communication standard applied to the communication bus, it has been required to speed up a data transmission rate (i.e., a data communication rate).

However, the present inventors have found a problem that it is difficult for the above-mentioned data transfer circuit 1x to address such a need. This is because it takes a great deal of time to read the pointer information from the memory, so that the period for reading leads to an idle period during which the data is not transferred to the communication bus. Further, the system bus is used also by another circuit. Therefore, when the use rights of the system bus compete against each other, the period for reading the pointer information (i.e., the idle period of the communication bus) is further lengthened.

Note that as a reference example, Japanese Unexamined Patent Application Publication No. 2002-222162 discloses a data transfer device which collectively transfers plural pieces of data in a case where these transfer destination areas (pages in a memory) are continuous ones, thereby shortening processing time on the setup for data transfer destinations. However, this data transfer device does not shorten the period for reading the pointer information from the memory, and thus cannot address the above-mentioned problem in any way.

A first aspect of the present invention is a data transfer circuit including: a controller that transfers data stored in a memory to a communication path; a first storage area for storing first pointer information used for reading, from the memory, first data generated in synchronization with a cycle for transferring data to the communication path; and a second storage area for storing second pointer information used for reading, from the memory, second data generated out of synchronization with the cycle for transferring data. The controller stores, in one cycle for transferring data, the first and second pointer information read from the memory respectively in the first and second storage areas, and sequentially transfers to the communication path the first and second data read from the memory by referring to the first and second pointer information. The controller updates, if transfer by a data length indicated in the second pointer information has not been completed upon the transfer of the second data, the data length to a data length of the remaining data, and updates an address indicated in the second pointer information to an address on the memory of the remaining data. The controller reads, in the next cycle for transferring data, the remaining data from the memory by referring to the second pointer information, and transfers the remaining data to the communication path.

Further, a second aspect of the present invention is a data transfer method which provides the one of transferring data stored in a memory to a communication path. This data transfer method includes: reading, in one cycle for transferring data to the communication path, first and second pointer information from the memory, holding the first and second pointer information, reading, from the memory, first data generated in synchronization with the one cycle for transferring data and second data generated out of synchronization with the one cycle for transferring data by referring to the first and second pointer information, and sequentially transferring the first and second data to the communication path; updating, if transfer by a data length indicated in the second pointer information has not been completed upon the transfer of the second data, the data length to a data length of the remaining data, and updating an address indicated in the second pointer information to an address on the memory of the remaining data; and reading, in the next cycle for transferring data, the remaining data from the memory by referring to the second pointer information, and transferring the remaining data to the communication path.

Namely, in the present invention, it is possible to reduce the number of times of reading pointer information for non-periodic transfer from a memory. Therefore, it is possible to allocate the period for reading the pointer information for non-periodic transfer as a period for reading data for non-periodic transfer (i.e., a period for transferring the data to a communication path). In other words, it is possible to convert the period for reading the pointer information for non-periodic transfer into the period for transferring the data to the communication path.

According to the present invention, it is possible to substantially improve a data transfer rate of the communication path as compared with the above-mentioned data transfer circuit 1x.

BRIEF DESCRIPTION OF THE DRAWINGS

The above and other aspects, advantages and features will be more apparent from the following description of certain embodiments taken in conjunction with the accompanying drawings, in which:

FIG. 12 is a diagram showing a configuration example of typical pointer information;

DETAILED DESCRIPTION

Hereinafter, first and second embodiments of a data transfer circuit according to the present invention will be described with reference to FIGS. 1 to 10. Note that the same signs are assigned to the same elements throughout the drawings, and their duplicated explanation is omitted as appropriate for clarifying the description.

First Embodiment

Figure 1:
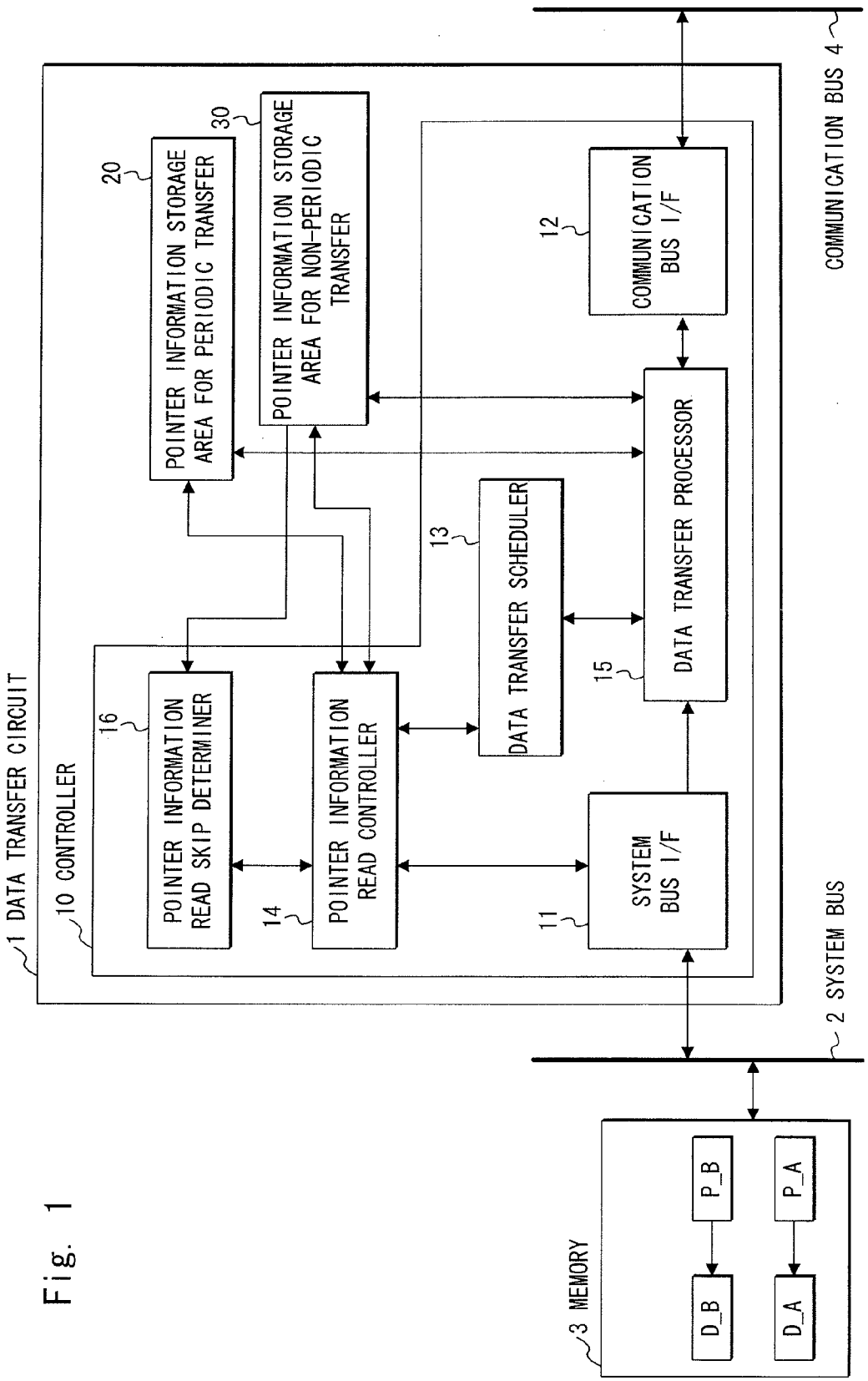
FIG. 1 is a block diagram showing a configuration example of a data transfer circuit which is common to first and second embodiments of the present invention.

As shown in FIG. 1, a data transfer circuit 1 according to this embodiment includes a controller 10, a pointer information storage area 20 for periodic transfer, and a pointer information storage area 30 for non-periodic transfer. The storage area 20 is the one for storing pointer information P_A for periodic transfer which is read from a memory 3. On the other hand, the storage area 30 is the one for storing pointer information P_B for non-periodic transfer which is read from the memory 3.

Further, the controller 10 generally includes a function of sequentially transferring, to a communication bus 4, data D_A for periodic transfer and data D_B for non-periodic transfer each of which is read from the memory 3 through a system bus 2. Specifically, the controller 10 includes a system bus I/F 11, a communication bus I/F 12, a data transfer scheduler 13, a pointer information read controller 14, a data transfer processor 15, and a pointer information read skip determiner 16.

The system bus I/F 11 operates as an interface with the system bus 2. On the other hand, the communication bus I/F 12 operates as an interface with the communication bus 4. Note that the data transfer circuit 1 can transfer the data not only to the communication bus 4, but also to a wireless transmission path. In the latter case, there may be provided a wireless I/F which modulates the data to be converted into a wireless signal, as a substitute for the communication bus I/F 12.

Further, the data transfer scheduler 13 schedules the order of transferring the data. Specifically, the data transfer scheduler 13 determines a data ID to be the subject of the periodic transfer and a data ID to be the subject of the non-periodic transfer, and instructs the pointer information read controller 14 and the data transfer processor 15 on the determined data IDs. Further, when the data transfer scheduler 13 receives notification from the data transfer processor 15 that a part of certain data for non-periodic transfer has been transferred in a certain frame, it continues to apply this data for non-periodic transfer as the subject to be transferred in the next frame.

Further, the pointer information read controller 14 reads the pointer information P_A for periodic transfer from the memory 3 through the system bus I/F 11, and stores it in the storage area 20. Further, the pointer information read controller 14 reads the pointer information P_B for non-periodic transfer from the memory 3 through the system bus I/F 11, and stores it in the storage area 30. Furthermore, the pointer information read controller 14 inquires of the pointer information read skip determiner 16 whether or not the read of the pointer information P_B for non-periodic transfer from the memory 3 can be skipped. When the pointer information read controller 14 receives a response indicating that the read can be skipped, it does not perform the read of the pointer information P_B for non-periodic transfer.

Further, the data transfer processor 15 reads the pointer information P_A for periodic transfer from the storage area 20 upon the periodic transfer, and executes a process to analyze the pointer information P_A and a process to transfer the data D_A for periodic transfer based on a result of the analysis. Further, the data transfer processor 15 reads the pointer information P_B for non-periodic transfer from the storage area 30 upon the non-periodic transfer, and executes a process to analyze the pointer information P_B and a process to transfer the data D_B for non-periodic transfer based on a result of the analysis. Furthermore, when the data transfer processor 15 transfers a part of the data D_B for non-periodic transfer, it notifies that to the data transfer scheduler 13. In addition, when the data transfer processor 15 transfers the part of the data D_B for non-periodic transfer, it updates a data length 202 indicated in the pointer information P_B to a data length of the remaining data of the data D_B for non-periodic transfer, and updates an address 201 indicated in the pointer information P_B to an address on the memory 3, which corresponds to the remaining data. In other words, the data transfer processor 15 updates the pointer information P_B on the storage area 30, but does not write it back to the memory 3.

Furthermore, the pointer information read skip determiner 16 receives the inquiry from the pointer information read controller 14, and then determines, as will be described later, whether or not the data transfer processor 15 has executed the process to update the pointer information P_B on the storage area 30. In a case where it is determined that the process to update the pointer information P_B has been executed, the pointer information read skip determiner 16 offers, to the pointer information read controller 14, a response indicating that the read of the pointer information P_B from the memory 3 can be skipped. On the other hand, in a case where it is determined that the process to update the pointer information P_B has not been executed, the pointer information read skip determiner 16 offers, to the pointer information read controller 14, a response indicating that the read of the pointer information P_B from the memory 3 cannot be skipped.

Next, an operation example of this embodiment will be described in detail with reference to FIGS. 2 to 5.

Figure 2:
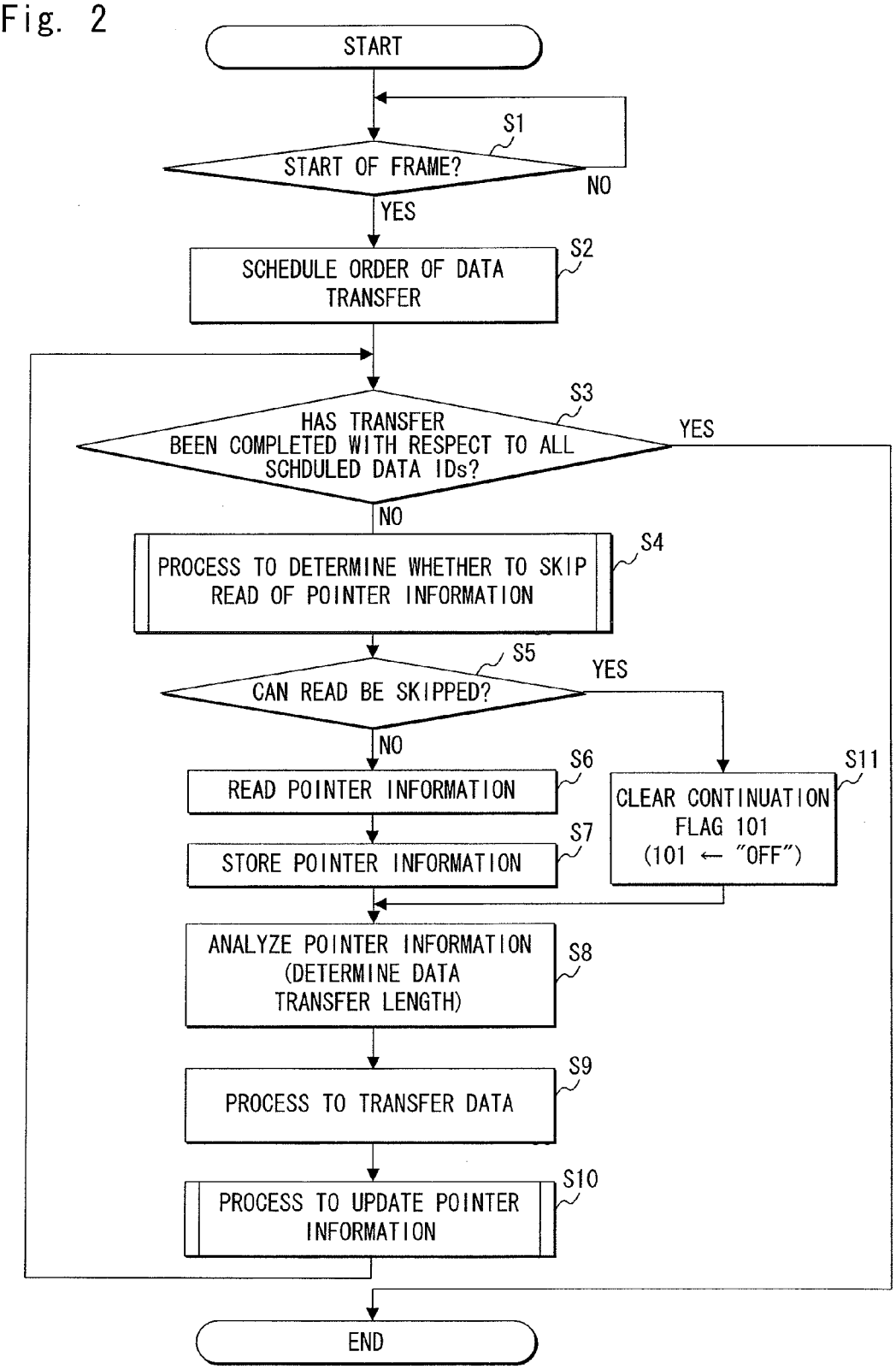
FIG. 2 is a flowchart showing an overall operation example of the data transfer circuit according to the first embodiment of the present invention.

As shown in FIG. 2, the data transfer scheduler 13 in the data transfer circuit 1 waits for the start of a frame (Step S1).

Figure 11:
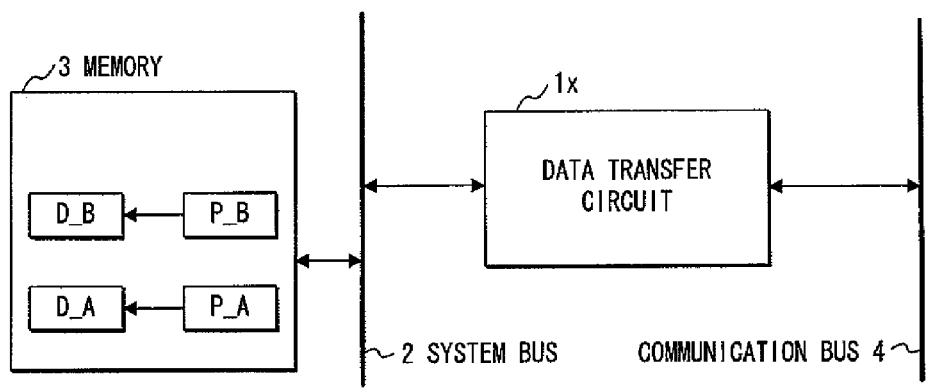
FIG. 11 is a block diagram showing a configuration example of a communication system to which a typical data transfer circuit is applied.
Figure 13:
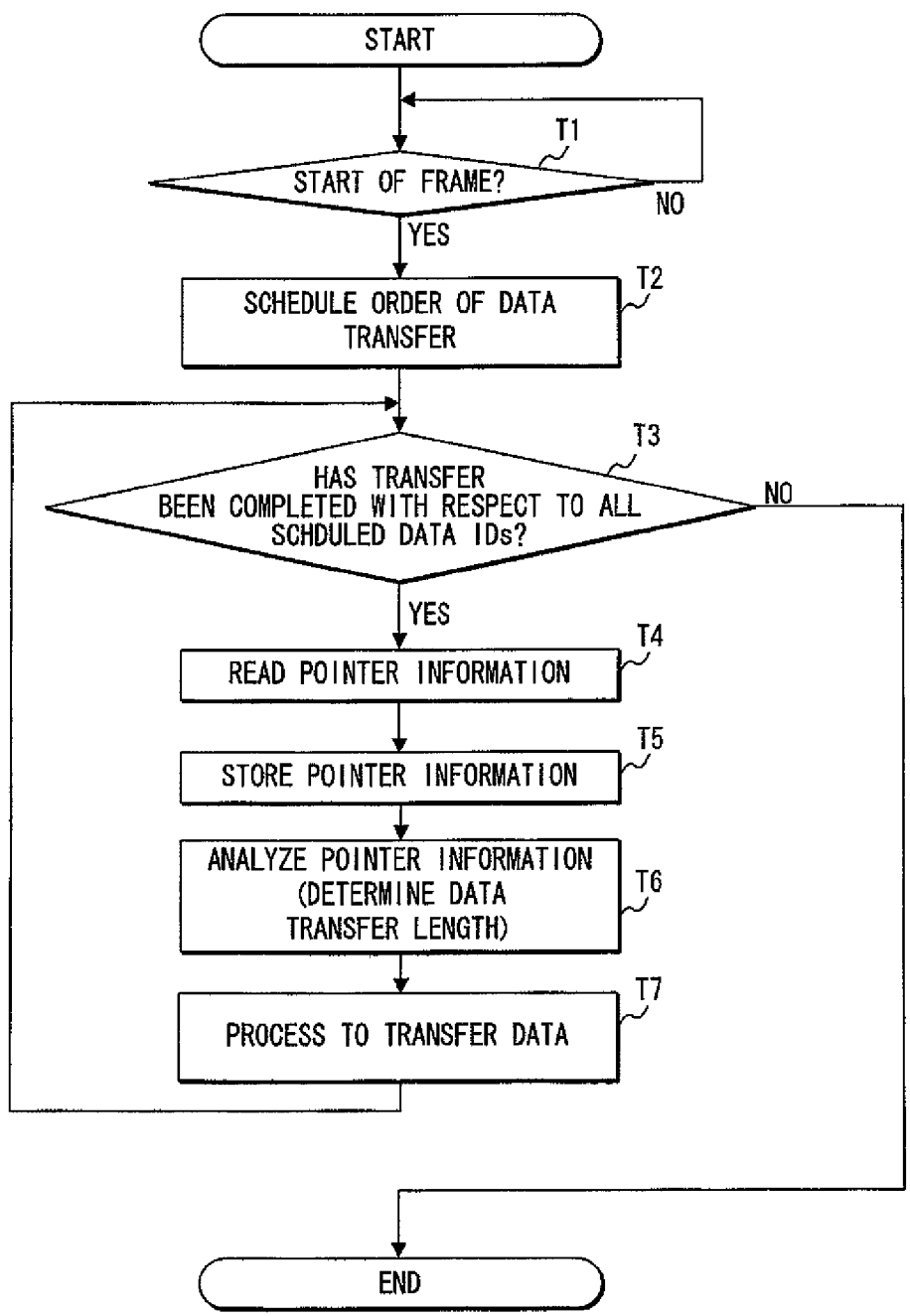
FIG. 13 is a flowchart showing an operation example of the typical data transfer circuit.
Figure 14:
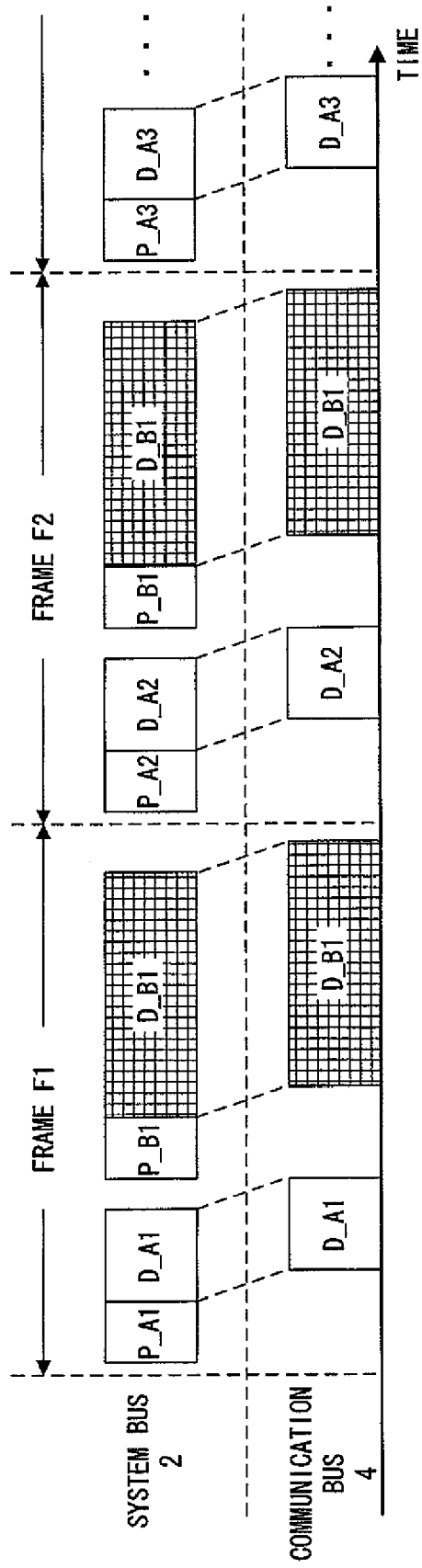
FIG. 14 is a time chart showing an example of frame transfer in the typical data transfer circuit.

When the frame is started, the data transfer scheduler 13 schedules the order of transferring the data (Step S2). At this time, the data transfer scheduler 13 allocates a period immediately after the start of the frame for the periodic transfer and allocates the remaining period for the non-periodic transfer, as with the above-mentioned data transfer circuit 1*x* shown in FIG. 11. Specifically, when plural pieces of data D_A for periodic transfer are stored in the memory 3, the data transfer scheduler 13 selects one piece of the data D_A for periodic transfer in ascending order of the data ID 204 (ID value), for example. On the other hand, when plural pieces of data D_B for non-periodic transfer are stored in the memory 3, the data transfer scheduler 13 selects one piece of the data D_B for non-periodic transfer in ascending order of the data ID 204, for example. Meanwhile, in a case where a continuation flag 101 has been set to "ON", the data transfer scheduler 13 continues to apply the data D_B for non-periodic transfer selected in the previous frame as the subject to be transferred.

The continuation flag 101 is the one indicating whether or not it is possible to continuously use the pointer information P_B for non-periodic transfer in the storage area 30 (i.e., whether or not the read of the pointer information P_B for non-periodic transfer from the memory 3 can be skipped). As will be described later, the continuation flag 101 is set to "ON (available)" when the data transfer processor 15 transfers the part of the data D_B for non-periodic transfer. Further, the continuation flag 101 is set to "OFF (unavailable)" at Step S11 which will be described later. Assume that the continuation flag 101 has been set to "OFF" in the initial state. Further, in the subsequent description, a process to set the continuation flag 101 to "ON" will be sometimes referred to as "set", and a process to set the continuation flag 101 to "OFF" will be sometimes referred to as "clear".

Then, until completion of transfer with respect to all data IDs scheduled at the above-mentioned Step S2 (Step S3), the data transfer circuit 1 repeatedly executes processes shown at the following Steps S4 to S11.

Figure 3:
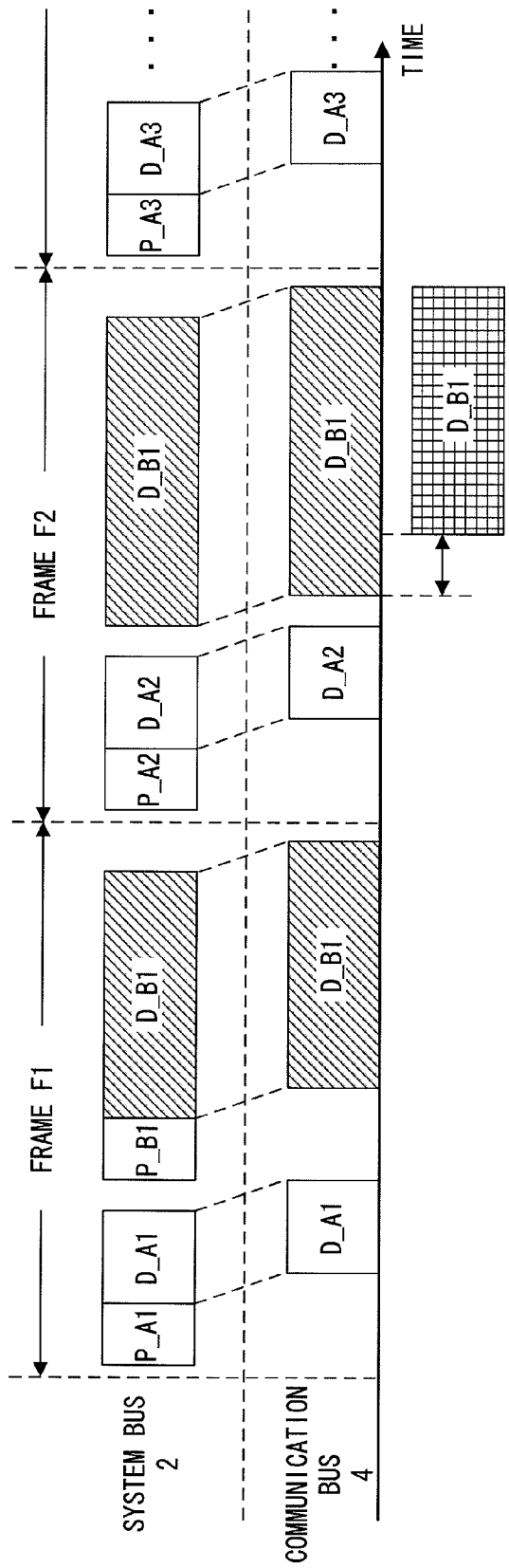
FIG. 3 is a time chart showing an example of frame transfer in the data transfer circuit according to the first embodiment of the present invention.

Assume that upon transfer in a frame F1 shown in FIG. 3, the data transfer scheduler 13 selects a data ID="A1" of data D_A1 for periodic transfer, and a data ID="B1" of data D_B1 for non-periodic transfer. In this case, the pointer information read controller 14 firstly inquires of the pointer information read skip determiner 16 whether or not read of pointer information with respect to the data ID="A1" from the memory 3 can be skipped.

Figure 4:
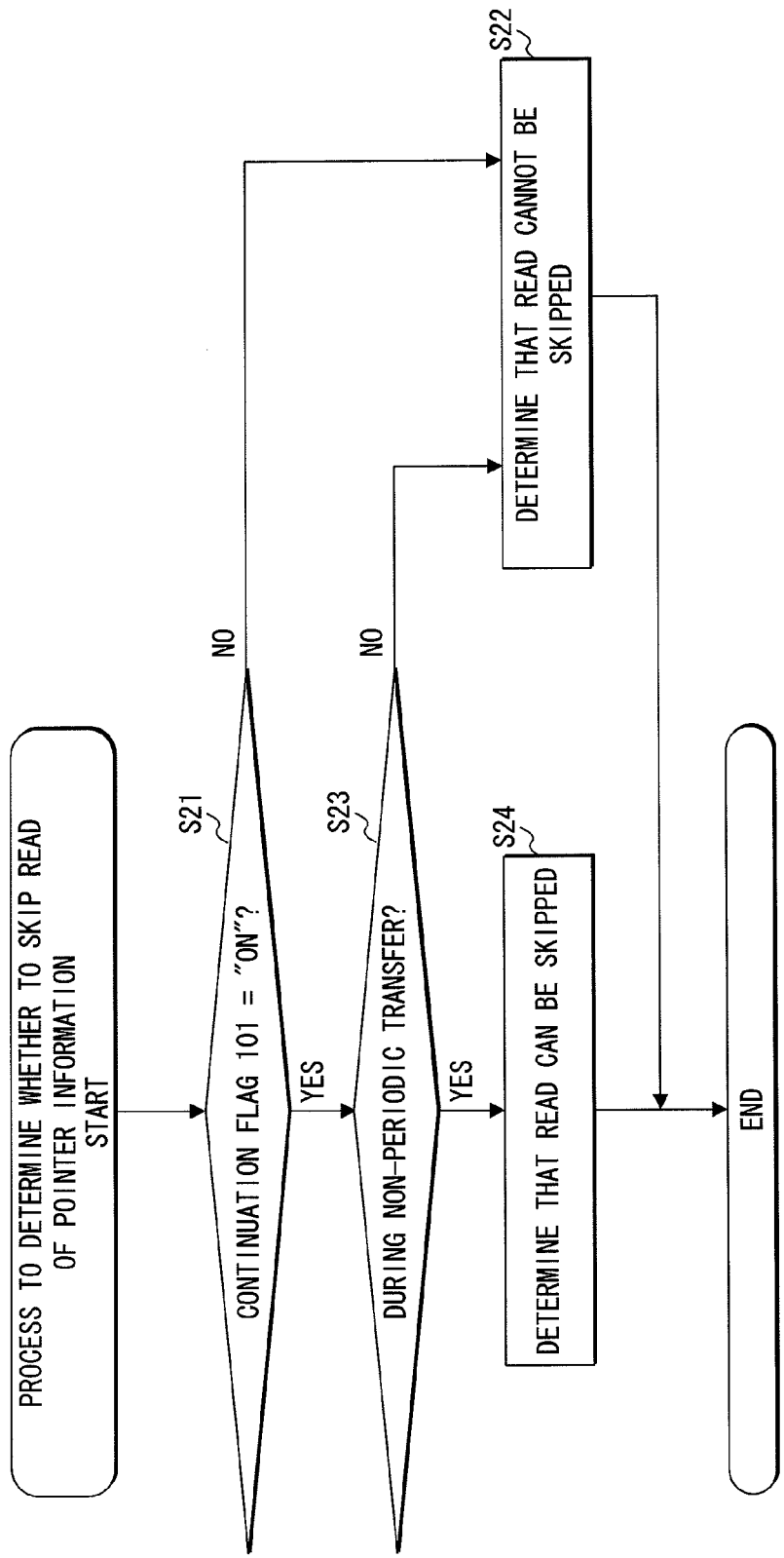
FIG. 4 is a flowchart showing an example of a process to determine whether to skip read of pointer information in the data transfer circuit according to the first embodiment of the present invention.

The pointer information read skip determiner 16 executes a process shown in FIG. 4 to determine whether to skip the read of the pointer information (Step S4). Specifically, the pointer information read skip determiner 16 determines whether or not the continuation flag 101 has been set (Step S21). In the initial state, the continuation flag 101 has been cleared. Therefore, the pointer information read skip determiner 16 determines that the read of the pointer information cannot be skipped, and offers a response indicating it to the pointer information read controller 14 (Step S22).

Returning to FIG. 2, when the response which indicates that the read of the pointer information cannot be skipped is received from the pointer information read skip determiner 16 (Step S5), the pointer information read controller 14 reads pointer information P_A1 for periodic transfer, which includes the data ID="A1", from the memory 3 through the system bus 2 as shown in FIG. 3 (Step S6). Further, the pointer information read controller 14 stores the read pointer information P_A1 in the storage area 20 (Step S7).

The data transfer processor 15, which has detected this storage, reads from the storage area 20 the read pointer information P_A1 to be analyzed (Step S8). Specifically, the data transfer processor 15 refers to the data length 202 indicated in the pointer information P_A1 to determine the data transfer length. In this example, assume that there is allocated a period during which the entire data D_A1 for periodic transfer can be transferred, and the data length 202 is determined as the data transfer length.

Then, the data transfer processor 15 executes a process to transfer the data D_A1 for periodic transfer, based on the pointer information P_A1 and the data transfer length determined at the above-mentioned Step S8 (Step S9).

Specifically, the data transfer processor 15 firstly reads data corresponding to the data transfer length from the address 201 indicated in the pointer information P_A1. Thus, as shown in FIG. 3, the data D_A1 for periodic transfer is transferred to the data transfer processor 15 through the system bus 2.

Next, as shown in FIG. 3, the data transfer processor 15 transfers the read data D_A1 for periodic transfer to the communication bus 4. In more detail, the data transfer processor 15 divides the data D_A1 into packet length units which are suitable to a communication standard applied to the communication bus 4, and appends a packet number (sequence number) to each packet to be transferred to the communication bus 4, as with the above-mentioned data transfer circuit 1x. When an acknowledgment (handshake packet) is received from a transfer destination device, the data transfer processor 15 determines that it has succeeded in transferring the data D_A1. On the other hand, when a negative acknowledgement (reception failure, retransmission request, halt request, or the like) is received from the transfer destination device, the data transfer processor 15 determines that it has failed in transferring the data D_A1, and then executes a process to retransmit the packets within the period allocated for transferring the data D_A1. Thus, as shown in FIG. 3, the data D_A1 for periodic transfer is transferred to the communication bus 4.

Figure 5:
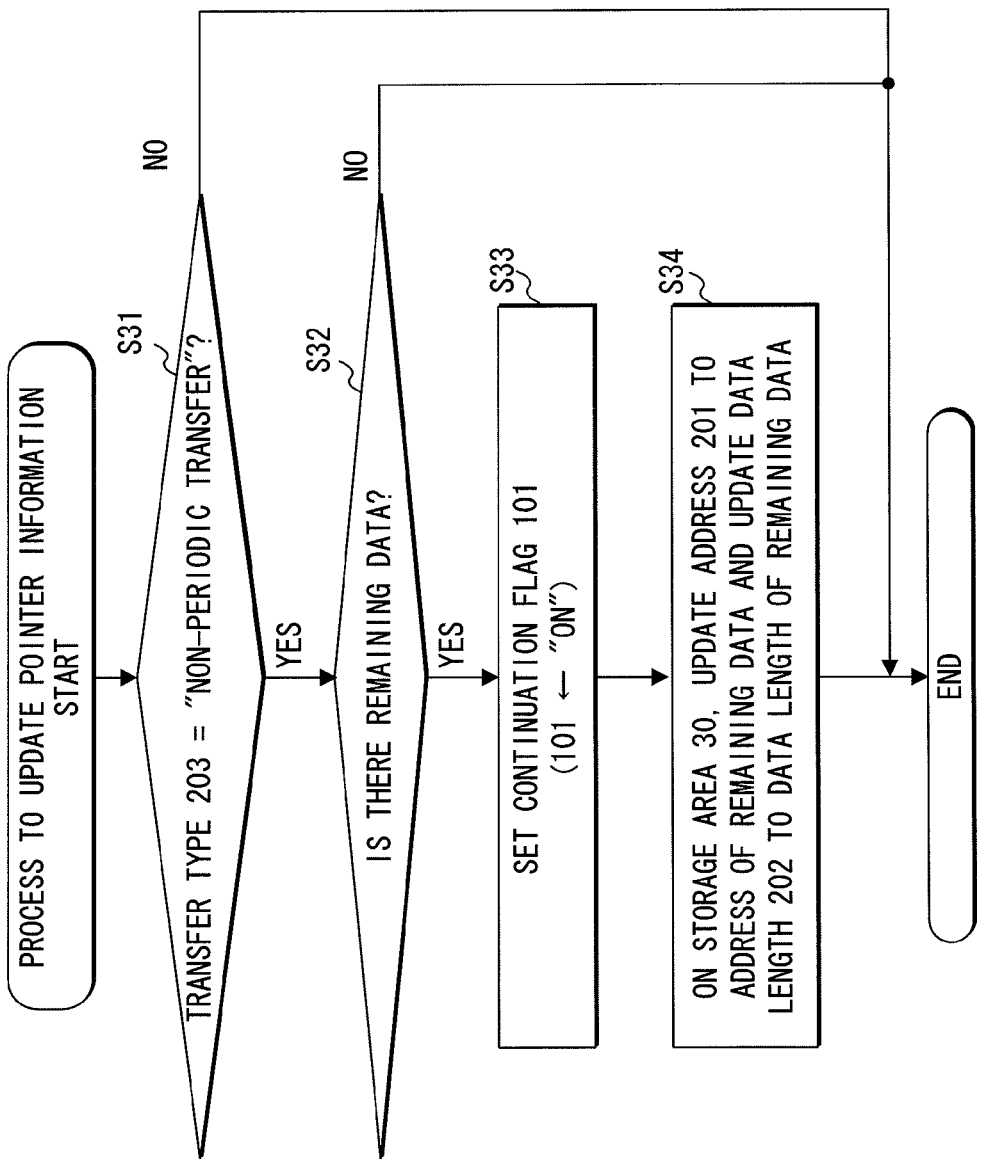
FIG. 5 is a flowchart showing an example of a process to update the pointer information in the data transfer circuit according to the first embodiment of the present invention.

Then, the data transfer processor 15 executes a process shown in FIG. 5 to update the pointer information (Step S10). Specifically, the data transfer processor 15 determines whether or not a transfer type 203 indicated in the pointer information P_A1 is set to "non-periodic transfer" (Step S31). As mentioned above, the transfer type 203="periodic transfer" is set in the pointer information for periodic transfer. Therefore, the data transfer processor 15 does not execute the subsequent Steps S32 to S34, and thus terminates the process to update the pointer information.

Returning to FIG. 2, the pointer information read controller 14 secondly inquires of the pointer information read skip determiner 16 whether or not read of pointer information with respect to the data ID="B1" from the memory 3 can be skipped.

The pointer information read skip determiner 16 re-executes the process to determine whether to skip the read of the pointer information at the above-mentioned Step S4. Specifically, the pointer information read skip determiner 16 determines again whether or not the continuation flag 101 has been set at the above-mentioned Step S21. As a result, the continuation flag 101 remains to be cleared. Therefore, at the above-mentioned Step S22, the pointer information read skip determiner 16 determines that the read of the pointer information cannot be skipped, and offers a response indicating it to the pointer information read controller 14.

The pointer information read controller 14, which has received this response, reads pointer information P_B1 for non-periodic transfer including the data ID="B1" from the memory 3 through the system bus 2 as shown in FIG. 3 at the above-mentioned Step S6. Further, at the above-mentioned Step S7, the pointer information read controller 14 stores the read pointer information P_B1 in the storage area 30.

The data transfer processor 15, which has detected this storage, reads from the storage area 30 the read pointer information P_B1 to be analyzed at the above-mentioned Step S8. Assume that the entire data D_B1 for non-periodic transfer cannot be transferred within a period which is allocated for transferring the data D_B1. In this case, the data transfer processor 15 determines, as the data transfer length, a data length equivalent to a part of the data D_B1.

Then, at the above-mentioned Step S9, the data transfer processor 15 executes a process to transfer the data D_B1 based on the pointer information P_B1 and the determined data transfer length. Thus, as shown in FIG. 3, the part of the data D_B1 is transferred to the data transfer processor 15 through the system bus 2, and then transferred to the communication bus 4.

Then, at the above-mentioned Step S10, the data transfer processor 15 re-executes the process to update the pointer information. At the above-mentioned Step S31 shown in FIG. 5, the data transfer processor 15 determines whether or not a transfer type 203 indicated in the pointer information P_B1 is set to "non-periodic transfer". As mentioned above, the transfer type 203="non-periodic transfer" is set in the pointer information for non-periodic transfer. Therefore, the data transfer processor 15 executes the subsequent Steps S32 to S34.

Specifically, in cases where there is the remaining data in the data D_B1 for non-periodic transfer (the cases include a case of failing in transferring even when retransmission processing is executed) (Step S32), the data transfer processor 15 sets the continuation flag 101 (Step S33). Further, on the storage area 30, the data transfer processor 15 updates the address 201 indicated in the pointer information P_B1 to an address on the memory 3, which corresponds to the remaining data, and updates the data length 202 indicated in the pointer information P_B1 to the remaining data length (Step S34).

Further, at the above-mentioned Step S3, the data transfer circuit 1 determines that the transfer has been completed with respect to all of the data IDs="A1" and "B1" scheduled at the above-mentioned Step S2, thereby terminating the transfer in the frame F1.

After that, when a frame F2 is started as shown in FIG. 3, the data transfer scheduler 13 newly selects a data ID="A2" of data D_A2 for periodic transfer at the above-mentioned Step S2. On the other hand, since the continuation flag 101 has been set, the data transfer scheduler 13 continues to select the data ID="B1" of the data D_B1 for non-periodic transfer, which was used in the previous frame F1.

Then, the data transfer circuit 1 executes the processes shown at the above-mentioned Steps S4 to S11, with respect to each of the data IDs="A2" and "B1".

Firstly, the pointer information read skip determiner 16 executes the process to determine whether to skip the read of the pointer information, with respect to the data ID="A2". At the above-mentioned Step S21 shown in FIG. 4, the pointer information read skip determiner 16 determines whether or not the continuation flag 101 has been set. Since the continuation flag 101 has been set, the pointer information read skip determiner 16 executes the subsequent Steps S23 and S24.

Specifically, the pointer information read skip determiner 16 determines whether or not the non-periodic transfer is in execution (Step S23). Because the data D_A2 for periodic transfer is currently transferred, the pointer information read skip determiner 16 determines that the non-periodic transfer is not in execution, and moves to the above-mentioned Step S22 to offer, to the pointer information read controller 14, a response indicating that the read of the pointer information cannot be skipped.

The pointer information read controller 14, which has received this response, reads pointer information P_A2 for periodic transfer including the data ID="A2" from the memory 3 through the system bus 2 as shown in FIG. 3.

Further, the pointer information read controller 14 stores (overwrites) the read pointer information P_A2 in the storage area 20.

The data transfer processor 15, which has detected this storage, analyzes the pointer information P_A2, thereby determining the data length 202 indicated in the pointer information P_A2 as the data transfer length. The data transfer processor 15 reads data corresponding to the data transfer length from the address 201 indicated in the pointer information P_A2. Thus, as shown in FIG. 3, the data D_A2 for periodic transfer is transferred to the data transfer processor 15 through the system bus 2.

Then, as shown in FIG. 3, the data transfer processor 15 transfers the read data D_A2 for periodic transfer to the communication bus 4.

Then, at the above-mentioned Step S31 shown in FIG. 5, the data transfer processor 15 determines whether or not a transfer type 203 indicated in the pointer information P_A2 is set to "non-periodic transfer". At this time, since the transfer type 203 is set to "periodic transfer", the data transfer processor 15 does not execute the above-mentioned Steps S32 to S34, and thus terminates the process to update the pointer information.

Next, the pointer information read skip determiner 16 executes the process to determine whether to skip the read of the pointer information, with respect to the data ID="B1". At the above-mentioned Step S21 shown in FIG. 4, the pointer information read skip determiner 16 determines whether or not the continuation flag 101 has been set. Since the continuation flag 101 has been set, the pointer information read skip determiner 16 determines whether or not the non-periodic transfer is in execution at the above-mentioned Step S23. Because the data D_B1 for non-periodic transfer is currently transferred, the pointer information read skip determiner 16 determines that the non-periodic transfer is in execution, and offers, to the pointer information read controller 14, a response indicating that the read of the pointer information can be skipped (Step S24). Further, as shown in FIG. 2, the pointer information read skip determiner 16 clears the continuation flag 101 (Step S11).

The pointer information read controller 14 skips the above-mentioned Steps S6 and S7, thereby skipping the read of the pointer information P_B1 for non-periodic transfer from the memory 3.

On the other hand, the data transfer processor 15 analyzes the pointer information P_B1, thereby determining the data length 202 indicated in the pointer information P_B1 as the data transfer length. The data transfer processor 15 reads data corresponding to the data transfer length from the address 201 indicated in the pointer information P_B1. Thus, as shown in FIG. 3, the remaining data of the data D_B1 for non-periodic transfer is transferred to the data transfer processor 15 through the system bus 2.

Then, as shown in FIG. 3, the data transfer processor 15 transfers the read remaining data of the data D_B1 for non-periodic transfer to the communication bus 4. After that, at the above-mentioned Step S32 shown in FIG. 5, the data transfer processor 15 determines that there is no remaining data in the data D_B1, thereby maintaining the continuation flag 101="OFF".

In this way, it is possible in this embodiment to reduce the number of times of reading the pointer information for non-periodic transfer from the memory, so that it is possible to allocate a longer period for transferring the data for non-periodic transfer to the communication bus (i.e., it is possible to improve a data transfer rate of the communication bus). This effect will be further clearly understood, by comparing the period shown in FIG. 3 by lattice patterns, during which the above-mentioned data transfer circuit 1x transfers the data D_B1 for non-periodic transfer in the frame F2, with the period during which the data transfer circuit 1 according to this embodiment transfers the data D_B1 for non-periodic transfer.

Second Embodiment

A data transfer circuit according to this embodiment can be configured as with the data transfer circuit 1 shown in FIG. 1. Meanwhile, the data transfer circuit according to this embodiment is different from that according to the above-mentioned first embodiment, in operating as shown in FIGS. 7 to 10 in order to address a different problem shown in FIG. 6, which is caused by the typical data transfer circuit 1x.

Figure 6:
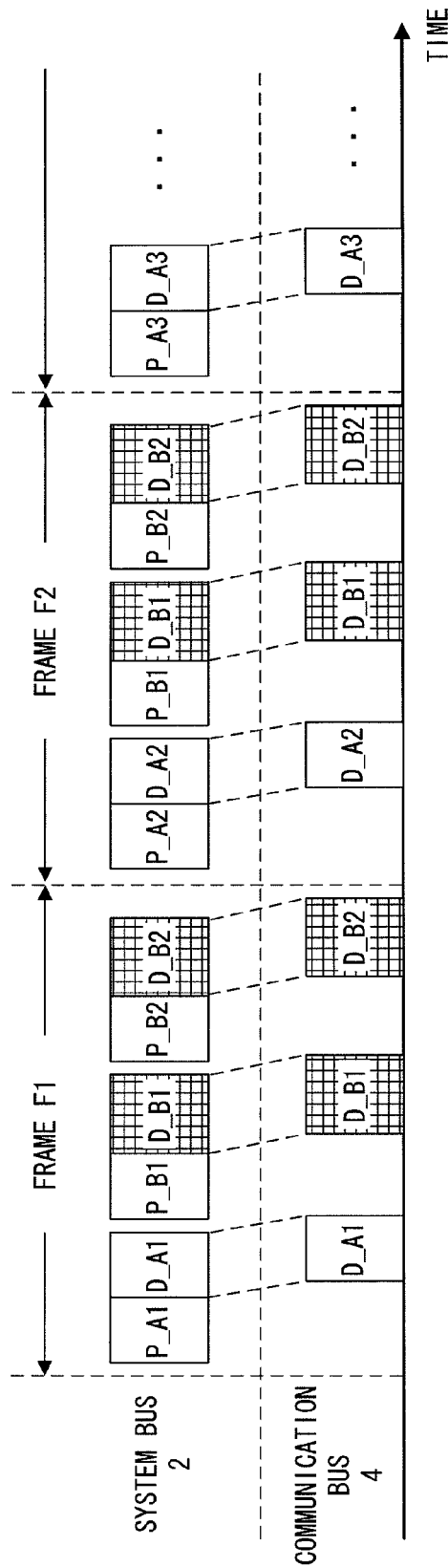
FIG. 6 is a time chart for explaining advantageous effects of the data transfer circuit according to the second embodiment of the present invention.

Firstly, with reference to FIG. 6, there is described the different problem caused by the typical data transfer circuit 1x. As shown in FIG. 6, use cases of data transfer include a case where plural pieces (in the shown example, 2 pieces) of data D_B1 and D_B2 for non-periodic transfer are transferred in the same frame. In this case, the present inventors have also found a problem that the data transfer rate deteriorates in the above-mentioned data transfer circuit 1x, due to reading of the pointer information from the memory for each frame and for each data.

Next, an operation example of this embodiment for addressing the above-mentioned problem will be described in detail with reference to FIGS. 7 to 10.

Figure 7:
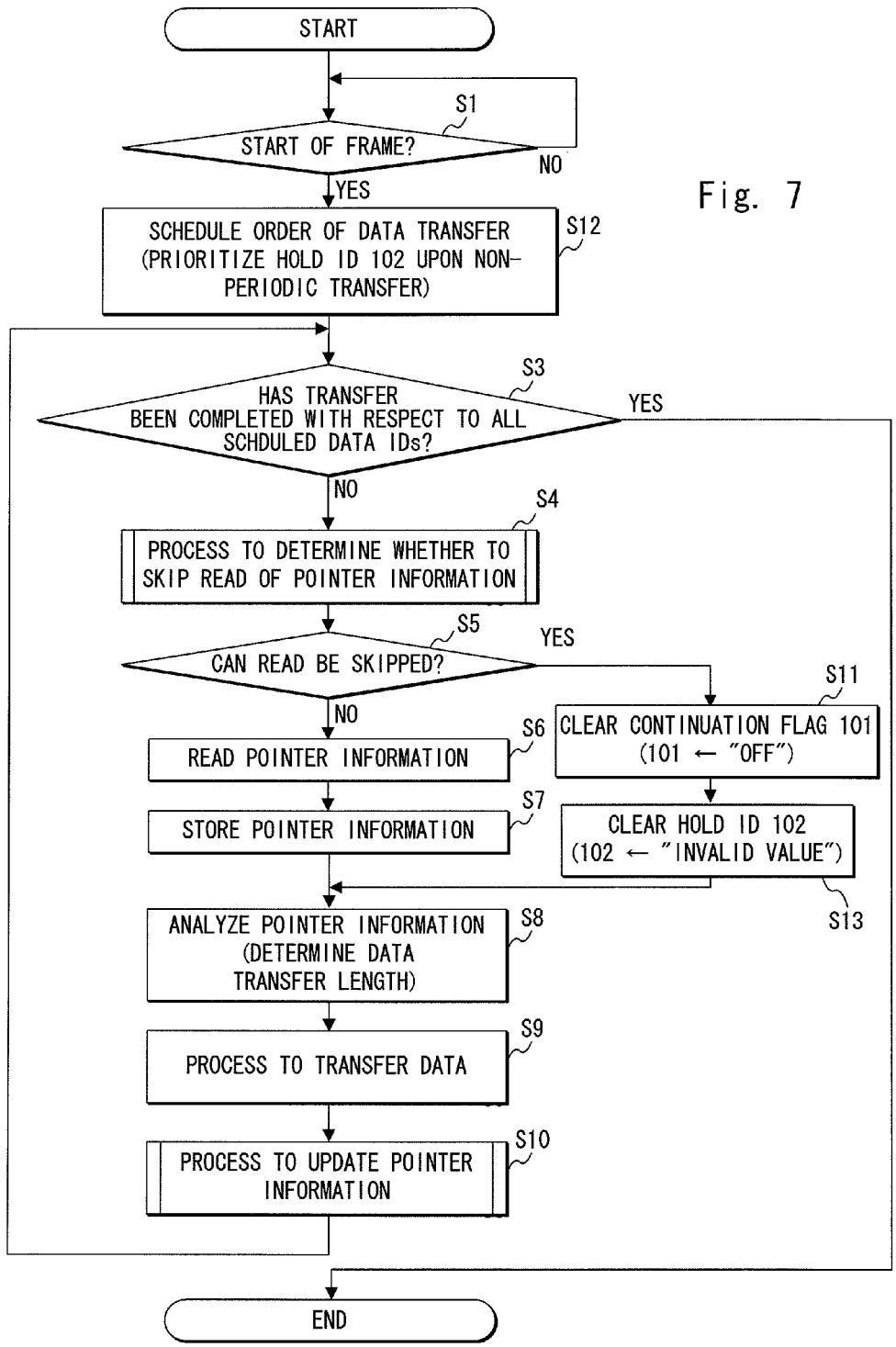
FIG. 7 is a flowchart showing an overall operation example of the data transfer circuit according to the second embodiment of the present invention.

As shown in FIG. 7, the data transfer scheduler 13 in the data transfer circuit 1 waits for the start of a frame at the above-mentioned Step S1.

When the frame is started, the data transfer scheduler 13 schedules the order of transferring the data (Step S12). At this time, the data transfer scheduler 13 allocates a period immediately after the start of the frame for the periodic transfer, as with the above-mentioned first embodiment. Meanwhile, unlike the above-mentioned first embodiment, the data transfer scheduler 13 allocates the remaining period for plural times of non-periodic transfer. Specifically, the data transfer scheduler 13 selects plural pieces of data D_B for non-periodic transfer in ascending order of the data ID 204, for example. Meanwhile, in a case where the continuation flag 101 has been set and a hold ID 102 has been set to a data ID which in not invalid, the data transfer scheduler 13 preferentially applies data for non-periodic transfer corresponding to the hold ID 102 as the subject of the non-periodic transfer, in advance of other pieces of data for non-periodic transfer.

As will be described later, the hold ID 102 is set to the data ID 204 included in the pointer information P_B for non-periodic transfer. Further, the hold ID 102 is updated every time the data transfer processor 15 transfers a part of the data D_B for non-periodic transfer. Furthermore, the hold ID 102 is initialized with "invalid value" at Step S13 which will be described later or Step S28 shown in FIG. 9. The "invalid value" is an ID value which cannot be included in the pointer information P_B for non-periodic transfer. Assume that the hold ID 102 has been set to "invalid value" in the initial state. Further, in the subsequent description, a process to initialize the hold ID 102 with "invalid value" will be sometimes referred to as "clear".

Then, the data transfer circuit 1 repeatedly executes processes shown at the above-mentioned Steps S4 to S11 and the following Step S13, until it is determined at the above-mentioned Step S3 that transfer has been completed with respect to all of the data IDs scheduled at the above-mentioned Step S12. Meanwhile, as will be described later, contents of the process to determine whether to skip the read of the pointer information, and the process to update the pointer information are modified from those in the above-mentioned first embodiment.

Figure 8:
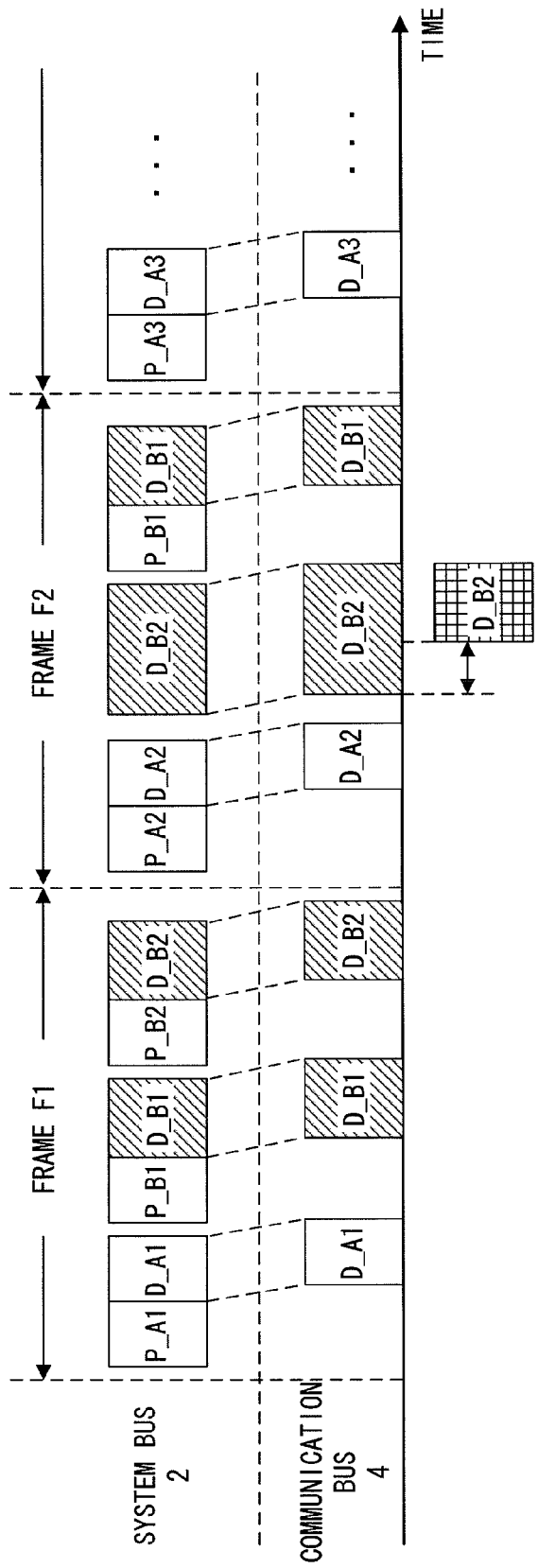
FIG. 8 is a time chart showing an example of frame transfer in the data transfer circuit according to the second embodiment of the present invention.

Assume that upon transfer in a frame F1 shown in FIG. 8, the data transfer scheduler 13 selects a data ID="A1" of data D_A1 for periodic transfer, and data IDs="B1" and "B2" of data D_B1 and D_B2 for non-periodic transfer. In this case, the pointer information read controller 14 firstly inquires of the pointer information read skip determiner 16 whether or not read of pointer information with respect to the data ID="A1" from the memory 3 can be skipped.

Figure 9:
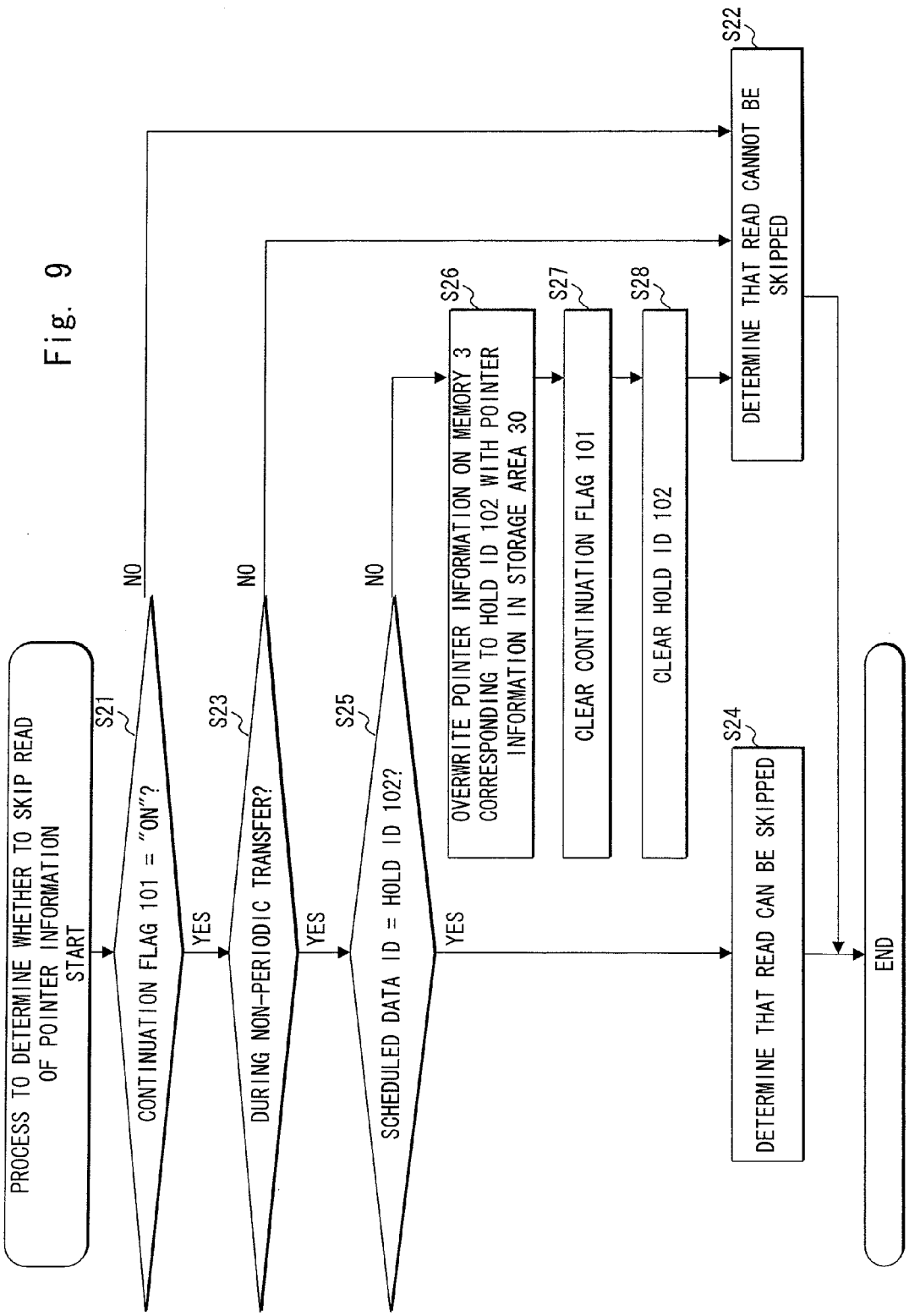
FIG. 9 is a flowchart showing an example of a process to update pointer information in the data transfer circuit according to the second embodiment of the present invention.

At the above-mentioned Step S4, the pointer information read skip determiner 16 executes a process shown in FIG. 9 to determine whether to skip the read of the pointer information. Specifically, at the above-mentioned Step S21, the pointer information read skip determiner 16 determines whether or not the continuation flag 101 has been set. In the initial state, the continuation flag 101 has been cleared. Therefore, at the above-mentioned Step S22, the pointer information read skip determiner 16 determines that the read of the pointer information cannot be skipped, and offers a response indicating it to the pointer information read controller 14.

Returning to FIG. 7, the pointer information read controller 14 receives from the pointer information read skip determiner 16 the response indicating that the read of the pointer information can be skipped at the above-mentioned Step S5, and then reads, as shown in FIG. 8, pointer information P_A1 for periodic transfer including the data ID="A1" from the memory 3 through the system bus 2 at the above-mentioned Step S6. At the above-mentioned Step S7, the pointer information read controller 14 stores the read pointer information P_A1 in the storage area 20.

The data transfer processor 15, which has detected this storage, reads from the storage area 20 the pointer information P_A1 to be analyzed at the above-mentioned Step S8, thereby determining the data length 202 indicated in the pointer information P_A1 as the data transfer length, as with the above-mentioned first embodiment.

Then, at the above-mentioned Step S9, the data transfer processor 15 executes a process to transfer the data D_A1 for periodic transfer based on the pointer information P_A1 and the determined data transfer length, thereby reading the data D_A1 for periodic transfer from the memory 3 through the system bus 2 as shown in FIG. 8, and transferring the data D_A1 to the communication bus 4.

Figure 10:
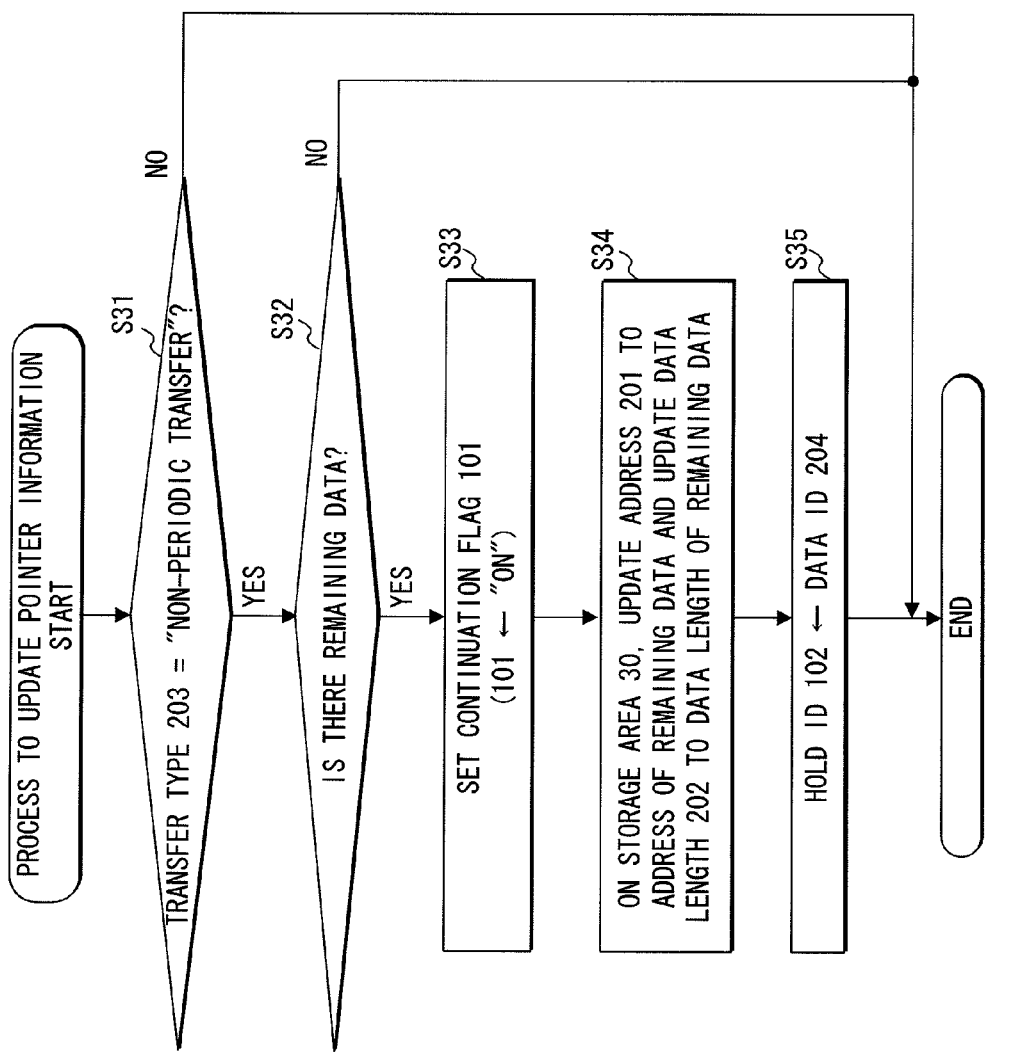
FIG. 10 is a flowchart showing an example of a process to determine whether to skip read of the pointer information in the data transfer circuit according to the second embodiment of the present invention.

Then, at the above-mentioned Step S10, the data transfer processor 15 executes a process shown in FIG. 10 to update the pointer information. Specifically, at the above-mentioned Step S31, the data transfer processor 15 determines whether or not a transfer type 203 indicated in the pointer information P_A1 is set to "non-periodic transfer". Since the transfer type 203 is set to "periodic transfer", the data transfer processor 15 does not execute the subsequent Steps S32 to S35, and thus terminates the process to update the pointer information.

Returning to FIG. 7, the pointer information read controller 14 secondly inquires of the pointer information read skip determiner 16 whether or not read of pointer information with respect to the data ID="B1" from the memory 3 can be skipped.

At the above-mentioned Step S4, the pointer information read skip determiner 16 re-executes the process to determine whether to skip the read of the pointer information. Specifically, at the above-mentioned Step S21, the pointer information read skip determiner 16 determines again whether or not the continuation flag 101 has been set. As a result, the continuation flag 101 remains to be cleared. Therefore, at the above-mentioned Step S22, the pointer information read skip determiner 16 determines that the read of the pointer information cannot be skipped, and offers a response indicating it to the pointer information read controller 14.

The pointer information read controller 14, which has received this response, reads pointer information P_B1 for non-periodic transfer including the data ID="B1" from the memory 3 through the system bus 2 as shown in FIG. 8 at the above-mentioned Step S6, and stores the read pointer information P_B1 in the storage area 30 at the above-mentioned Step S7.

The data transfer processor 15, which has detected this storage, reads from the storage area 30 the read pointer information P_B1 to be analyzed at the above-mentioned Step S8. Assume that the entire data D_B1 for non-periodic transfer cannot be transferred within a period which is allocated for transferring the data D_B1. In this case, the data transfer processor 15 determines, as the data transfer length, a data length equivalent to a part of the data D_B1.

Then, at the above-mentioned Step S9, the data transfer processor 15 executes a process to transfer the data D_B1 based on the pointer information P_B1 and the determined data transfer length. Thus, as shown in FIG. 8, the part of the data D_B1 is read from the memory 3 through the system bus 2, and then transferred to the communication bus 4.

Then, at the above-mentioned Step S10, the data transfer processor 15 re-executes the process to update the pointer information. At the above-mentioned Step S31 shown in FIG. 10, the data transfer processor 15 determines whether or not a transfer type 203 indicated in the pointer information P_B1 is set to "non-periodic transfer". Since the transfer type 203 is set to "non-periodic transfer", the data transfer processor 15 executes the subsequent Steps S32 to S35.

Specifically, since there is the remaining data in the data D_B1, the data transfer processor 15 sets the continuation flag 101 at the above-mentioned Step S33.

Next, the data transfer processor 15 moves to the above-mentioned Step S34. On the storage area 30, the data transfer processor 15 updates the address 201 indicated in the pointer information P_B1 to an address on the memory 3, which corresponds to the remaining data, and updates the data length 202 indicated in the pointer information P_B1 to the remaining data length.

Next, the data transfer processor 15 sets the hold ID 102 to the data ID="B1" of the data D_B1 (Step S35).

After that, the pointer information read controller 14 inquires of the pointer information read skip determiner 16 whether or not read of pointer information with respect to the data ID="B2" from the memory 3 can be skipped.

At the above-mentioned Step S4, the pointer information read skip determiner 16 re-executes the process to determine whether to skip the read of the pointer information. Specifically, at the above-mentioned Step S21 shown in FIG. 9, the pointer information read skip determiner 16 determines again whether or not the continuation flag 101 has been set. As a result, since the continuation flag 101 has been set, the pointer information read skip determiner 16 determines whether or not the non-periodic transfer is in execution at the above-mentioned Step S23. Because the data D_B2 for non-periodic transfer is currently transferred, the pointer information read skip determiner 16 determines that the non-periodic transfer is in execution.

Next, the pointer information read skip determiner 16 determines whether or not the scheduled data ID coincides with the hold ID 102 (Step S25). The scheduled data ID="B2" does not coincide with the hold ID 102="B1". Therefore, the pointer information read skip determiner 16 overwrites the pointer information P_B1 for non-periodic transfer on the memory 3, which corresponds to the hold ID 102, with the pointer information P_B1 in the storage area 30 (Step S26). Further, the pointer information read skip determiner 16 clears the continuation flag 101, and clears the hold ID 102 (Steps S27 and S28). Furthermore, the pointer information read skip determiner 16 moves to the above-mentioned Step S22. The pointer information read skip determiner 16 determines that the read of the pointer information cannot be skipped, and offers a response indicating it to the pointer information read controller 14.

The pointer information read controller 14, which has received this response, reads pointer information P_B2 for non-periodic transfer including the data ID="B2" from the memory 3 through the system bus 2 as shown in FIG. 8 at the above-mentioned Step S6, and stores (overwrites) the read pointer information P_B2 in the storage area 30 at the above-mentioned Step S7.

The data transfer processor 15, which has detected this storage, reads from the storage area 30 the read pointer information P_B2 to be analyzed at the above-mentioned Step S8. Assume that the entire data D_B2 for non-periodic transfer cannot be transferred within a period which is allocated for transferring the data D_B2. In this case, the data transfer processor 15 determines, as the data transfer length, a data length equivalent to a part of the data D_B2.

Then, at the above-mentioned Step S9, the data transfer processor 15 executes a process to transfer the data D_B2 based on the pointer information P_B2 and the determined data transfer length. Thus, as shown in FIG. 8, the part of the data D_B2 is read from the memory 3 through the system bus 2, and then transferred to the communication bus 4.

Then, at the above-mentioned Step S10, the data transfer processor 15 re-executes the process to update the pointer information. At the above-mentioned Step S31 shown in FIG. 10, the data transfer processor 15 determines whether or not a transfer type 203 indicated in the pointer information P_B2 is set to "non-periodic transfer". Since the transfer type 203 is set to "non-periodic transfer", the data transfer processor 15 passes through the above-mentioned Step S32 and moves to the above-mentioned Step S33, thereby setting the continuation flag 101.

Next, the data transfer processor 15 moves to the above-mentioned Step S34. On the storage area 30, the data transfer processor 15 updates the address 201 indicated in the pointer information P_B2 to an address on the memory 3, which corresponds to the remaining data of the data D_B2, and updates the data length 202 indicated in the pointer information P_B2 to the remaining data length of the data D_B2. Further, at the above-mentioned Step S35, the data transfer processor 15 updates the hold ID 102 to the data ID="B2".

Thus, in the next frame F2, the data D_B2 will be preferentially applied as the subject of the non-periodic transfer in advance of the data D_B1.

After that, when the frame F2 is started as shown in FIG. 8, the data transfer scheduler 13 newly selects a data ID="A2" of data D_A2 for periodic transfer at the above-mentioned Step S12. On the other hand, since the continuation flag 101 has been set, the data transfer scheduler 13 continues to select the data IDs="B1" and "B2" of the data D_B1 and D_B2 for non-periodic transfer, which were used in the previous frame F1. Further, since the hold ID 102 has been set to "B2", the data transfer scheduler 13 selects the data IDs="B2" and "B1" in this order.

Then, the data transfer circuit 1 executes the processes shown at the above-mentioned Steps S4 to S11 and S13, with respect to each of the data IDs="A2", "B2" and "B1".

Firstly, the pointer information read skip determiner 16 executes the process to determine whether to skip the read of the pointer information, with respect to the data ID="A2". At the above-mentioned Step S21 shown in FIG. 9, the pointer information read skip determiner 16 determines whether or not the continuation flag 101 has been set. Since the continuation flag 101 has been set, the pointer information read skip determiner 16 moves to the above-mentioned Step S23 to determine whether or not the non-periodic transfer is in execution. Because the data D_A2 for periodic transfer is currently transferred, the pointer information read skip determiner 16 determines that the non-periodic transfer is not in execution, and moves to the above-mentioned Step S22 to offer, to the pointer information read controller 14, a response indicating that the read of the pointer information cannot be skipped.

The pointer information read controller 14, which has received this response, reads pointer information P_A2 for periodic transfer including the data ID="A2" from the memory 3 through the system bus 2 as shown in FIG. 8. Further, the pointer information read controller 14 stores (overwrites) the read pointer information P_A2 in the storage area 20.

The data transfer processor 15, which has detected this storage, analyzes the pointer information P_A2, thereby determining the data length 202 indicated in the pointer information P_A2 as the data transfer length. The data transfer processor 15 reads data corresponding to the data transfer length from the address 201 indicated in the pointer information P_A2. Thus, as shown in FIG. 8, the data D_A2 for periodic transfer is read from the memory 3 through the system bus 2, and then transferred to the communication bus 4.

Then, at the above-mentioned Step S31 shown in FIG. 10, the data transfer processor 15 determines whether or not a transfer type 203 indicated in the pointer information P_A2 is set to "non-periodic transfer". At this time, since the transfer type 203 is set to "periodic transfer", the data transfer processor 15 terminates the process to update the pointer information.

Next, the pointer information read skip determiner 16 executes the process to determine whether to skip the read of the pointer information, with respect to the data ID="B2". At the above-mentioned Step S21 shown in FIG. 9, the pointer information read skip determiner 16 determines whether or not the continuation flag 101 has been set. Since the continuation flag 101 has been set, the pointer information read skip determiner 16 determines whether or not the non-periodic transfer is in execution at the above-mentioned Step S23. Because the data D_B2 for non-periodic transfer is currently transferred, the pointer information read skip determiner 16 determines that the non-periodic transfer is in execution.

Then, at the above-mentioned Step S25, the pointer information read skip determiner 16 determines whether or not the scheduled data ID coincides with the hold ID 102. The scheduled data ID="B2" coincides with the hold ID 102="B2". Therefore, the pointer information read skip determiner 16 moves to the above-mentioned Step S24. The pointer information read skip determiner 16 determines that the read of the pointer information can be skipped, and offers a response indicating it to the pointer information read controller 14. Further, the pointer information read skip determiner 16 clears the continuation flag 101 at the above-mentioned Step S11 shown in FIG. 7, and clears the hold ID 102 (Step S13).

The pointer information read controller 14 skips the above-mentioned Steps S6 and S7, thereby skipping the read of the pointer information P_B2 for non-periodic transfer from the memory 3.

On the other hand, the data transfer processor 15 analyzes the pointer information P_B2, thereby determining the data length 202 indicated in the pointer information P_B2 as the data transfer length. The data transfer processor 15 reads data corresponding to the data transfer length from the address 201 indicated in the pointer information P_B2. Thus, as shown in FIG. 8, the remaining data of the data D_B2 for non-periodic transfer is read from the memory 3 through the system bus 2, and then transferred to the communication bus 4. After that, at the above-mentioned Step S32 shown in FIG. 10, the data transfer processor 15 determines that there is no remaining data in the data D_B2, thereby maintaining the continuation flag 101="OFF".

Next, the pointer information read skip determiner 16 executes the process to determine whether to skip the read of the pointer information, with respect to the data ID="B1". At the above-mentioned Step S21 shown in FIG. 9, the pointer information read skip determiner 16 determines whether or not the continuation flag 101 has been set. Since the continuation flag 101 has been cleared, the pointer information read skip determiner 16 moves to the above-mentioned Step S22. The pointer information read skip determiner 16 determines that the read of the pointer information cannot be skipped, and offers a response indicating it to the pointer information read controller 14.

The pointer information read controller 14, which has received this response, reads the pointer information P_B1 for non-periodic transfer including the data ID="B1" from the memory 3 through the system bus 2 as shown in FIG. 8. Further, the pointer information read controller 14 stores (overwrites) the read pointer information P_B1 in the storage area 30.

The data transfer processor 15, which has detected this storage, analyzes the pointer information P_B1, thereby determining the data length 202 indicated in the pointer information P_B1 as the data transfer length. The data transfer processor 15 reads data corresponding to the data transfer length from the address 201 indicated in the pointer information P_B1. Thus, as shown in FIG. 8, the remaining data of the data D_B1 for non-periodic transfer is read from the memory 3 through the system bus 2, and then transferred to the communication bus 4. After that, at the above-mentioned Step S32 shown in FIG. 10, the data transfer processor 15 determines that there is no remaining data in the data D_B1, thereby maintaining the continuation flag 101="OFF".

In this way, it is possible in this embodiment to reduce the number of times of reading the pointer information for non-periodic transfer from the memory even when the plural pieces of data for non-periodic transfer are transferred in the same frame, so that it is possible to improve a data transfer rate of the communication bus. This effect will be further clearly understood, by comparing the period shown in FIG. 8 by lattice patterns, during which the above-mentioned data transfer circuit 1x transfers the data D_B2 for non-periodic transfer in the frame F2, with the period during which the data transfer circuit 1 according to this embodiment transfers the data D_B2 for non-periodic transfer. Further, each data for non-periodic transfer can be transferred to the communication bus without any delay.

Further, in a case where the data for periodic transfer is not stored in the memory (i.e., in a case where it is not necessary to transfer the data for periodic transfer), the pointer information storage area 20 for periodic transfer may be diverted into a pointer information storage area for non-periodic transfer, so that two pieces of pointer information for non-periodic transfer are read from the memory in parallel. In this case, if the continuation flag and the hold ID are provided for each storage area, and if similar processes with FIGS. 7, 9 and 10 are executed for each storage area, it is possible to further reduce the number of times of reading the pointer information for non-periodic transfer from the memory. Specifically, the read of the pointer information for non-periodic transfer is skipped twice each frame.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A data transfer circuit comprising:
   a controller that transfers data stored in a memory to a communication path;
   a first storage area for storing first pointer information used for reading, from the memory, first data generated in synchronization with a cycle for transferring data to the communication path; and
   a second storage area for storing second pointer information used for reading, from the memory, second data generated out of synchronization with the cycle for transferring data,
   wherein the controller is configured to:
   store, in one cycle for transferring data, the first and second pointer information read from the memory respectively in the first and second storage areas, and sequentially transfer to the communication path the first and second data read from the memory by referring to the first and second pointer information;
   update, if transfer by a data length indicated in the second pointer information has not been completed upon the transfer of the second data, the data length to a data length of the remaining data, and update an address indicated in the second pointer information to an address on the memory of the remaining data; and
   read, in the next cycle for transferring data, the remaining data from the memory by referring to the second pointer information, and transfer the remaining data to the communication path.

2. The data transfer circuit according to claim 1, wherein the controller is further configured to:
   sequentially read, from the memory, "n" pieces (n is an integer number of two or more) of pointer information as the second pointer information in the one cycle for transferring data, selectively store the "n" pieces of pointer information in the second storage area, sequentially read, from the memory, "n" pieces of data as the second data by referring to the second pointer information every time it is stored, and transfer the "n" pieces of data to the communication path;
   perform the updating for the second pointer information if transfer by a data length indicated in the second pointer information has not been completed upon the transfer of each of the "n" pieces of data; and read, from the memory, one piece of remaining data corresponding to one piece of data among the "n" pieces of data by referring to the second pointer information in the next cycle for transferring data, and transfer the one piece of remaining data to the communication path.

3. The data transfer circuit according to claim 2, wherein the controller is further configured to:

update, if transfer by a data length indicated in the second pointer information has not been completed upon the transfer of another piece of data among the "n" pieces of data, pointer information that is stored in the memory and corresponds to the anther piece of data by using a data length and an address on the memory of another piece of remaining data corresponding to the another piece of data; and read, from the memory, the pointer information that corresponds to the another piece of data in the next cycle for transferring data after the transfer of the one piece of remaining data, store the pointer information that corresponds to the another piece of data in the second storage area, read the another piece of remaining data from the memory by referring to the pointer information that corresponds to the another piece of data, and transfer the another piece of remaining data to the communication path.

4. A method of transferring data stored in a memory to a communication path, the method comprising:

reading, in one cycle for transferring data to the communication path, first and second pointer information from the memory, holding the first and second pointer information, reading, from the memory, first data generated in synchronization with the one cycle for transferring data and second data generated out of synchronization with the one cycle for transferring data by referring to the first and second pointer information, and sequentially transferring the first and second data to the communication path;

updating, if transfer by a data length indicated in the second pointer information has not been completed upon the transfer of the second data, the data length to a data length of the remaining data, and updating an address indicated in the second pointer information to an address on the memory of the remaining data; and reading, in the next cycle for transferring data, the remaining data from the memory by referring to the second pointer information, and transferring the remaining data to the communication path.

5. The method according to claim 4, further including:

sequentially reading, from the memory, "n" pieces (n is an integer number of two or more) of pointer information as the second pointer information in the one cycle for transferring data, selectively holding the "n" pieces of pointer information, sequentially reading, from the memory, "n" pieces of data as the second data by referring to the second pointer information every time it is held, and transferring the "n" pieces of data to the communication path;

performing the updating for the second pointer information if transfer by a data length indicated in the second pointer information has not been completed upon the transfer of each of the "n" pieces of data; and reading, from the memory, one piece of remaining data corresponding to one piece of data among the "n" pieces of data by referring to the second pointer information in the next cycle for transferring data, and transferring the one piece of remaining data to the communication path.

6. The method according to claim 5, further including:

updating, if transfer by a data length indicated in the second pointer information has not been completed upon the transfer of another piece of data among the "n" pieces of data, pointer information that is stored in the memory and corresponds to the anther piece of data by using a data length and an address on the memory of another piece of remaining data corresponding to the another piece of data; and reading, from the memory, the pointer information that corresponds to the another piece of data in the next cycle for transferring data after the transfer of the one piece of remaining data, holding the pointer information that corresponds to the another piece of data, reading the another piece of remaining data from the memory by referring to the pointer information that corresponds to the another piece of data, and transferring the another piece of remaining data to the communication path.

* * * * *